July 10, 1956 A. BENNETT ET AL 2,754,418

CONTROL CIRCUIT FOR A SERVO SYSTEM

Filed April 28, 1949

INVENTORS
ALFRED BENNETT
JOHN C. OWEN
BY
ATTORNEY

United States Patent Office 2,754,418
Patented July 10, 1956

2,754,418

CONTROL CIRCUIT FOR A SERVO SYSTEM

Alfred Bennett, New York, N. Y., and John C. Owen, Palisades Park, N. J., assignors to Bendix Aviation Corporation, Teterboro, N. J., a corporation of Delaware Application April 28, 1949, Serial No. 90,236

3 Claims. (Cl. 250—27)

This invention relates to control apparatus or systems generally and more particularly to a novel electric circuit adapted to act as an amplifier, a rate or phase lead deriving circuit, or a high pass or low pass filter or both.

An object of the present invention is to provide a novel thermionic amplifier whose output signal will constitute an averaged or integrated input signal modified by some selected amplification factor.

Another object of the invention is to provide a novel electric circuit which can be applied for dampening purposes to a control system such as an automatic pilot for aircraft, for example, utilizing electric servo-mechanisms and which also can be used as either a high pass or a low pass filter or both.

A further object is to provide a novel all-electric servo-mechanism which contains no moving parts.

A still further object of the present invention is to provide a novel electric circuit for use with control apparatus comprising an input signal device and a discriminator device with an amplifier interconnecting the two devices, an electric driver being associated with the discriminator which develops a control signal of a given phase and amplitude as a linear function of the input, a feed back connection being provided between the driver and the input signal device for opposing and cancelling the signal.

Another object is to provide a novel electric circuit which can act as a high pass and a low pass filter at the same time.

The foregoing and other objects and advantages of the invention will appear more fully hereinafter from a consideration of the detailed description which follows, taken together with the accompanying drawing wherein several embodiments of the invention are illustrated. It is to be expressly understood, however, that the drawing is for the purpose of illustration and description only, and is not designed as a definition of the limits of the invention.

In the drawings, wherein like reference characters refer to like parts throughout the several views.

Figure 1:
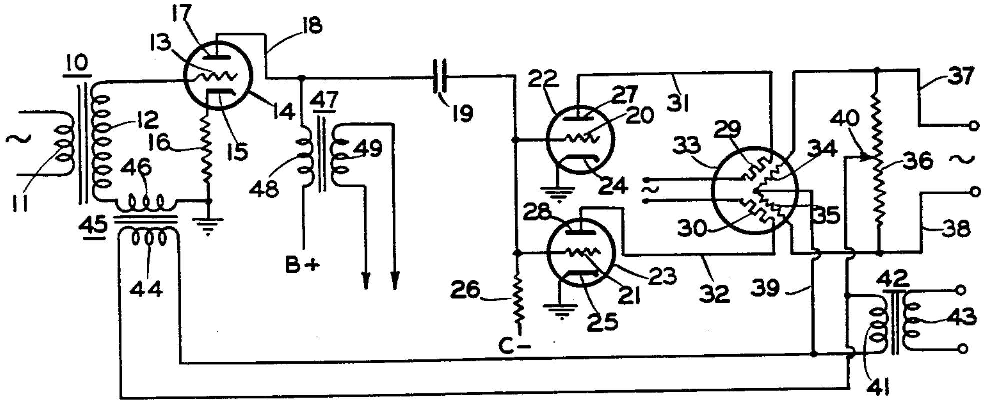
Figure 1 is a wiring diagram of the novel electric circuit constituting the subject matter of the present invention.

Referring now to the drawing for a more detailed description of the present invention and more particularly to Figure 1 thereof, the novel electric circuit hereof is shown as comprising an input transformer 10 having a primary winding 11 which has impressed thereon an amplitude modulated signal developed as a result of a variable condition or function being considered. The signal of primary winding 11 is induced within the secondary winding 12 of the transformer and applied to the grid 13 of a high gain amplifier tube 14 whose cathode 15 connects to ground through a cathode resistor 16, the free end of secondary winding 12 likewise being grounded.

Plate 17 of tube 14 connects by way of a conductor 18 and a condenser 19 with the grids 20 and 21 of a pair of discriminator tubes 22 and 23, respectively. While the discriminators have been shown as comprising two separate triode tubes 22 and 23, it is to be understood that, where desired, a double triode tube could be utilized equally as well. Cathodes 24 and 25 of the tubes are grounded as shown while grids 20 and 21 are connected to a negative supply by way of a grid leak resistor 26. Plates 27 and 28 of tubes 22 and 23 are connected with heater elements 29 and 30, respectively, by way of leads 31 and 32, the heater elements being connected to a suitable source of supply in phase with the signal frequency.

Heater elements 29 and 30 are constituent parts of a thermal time delay device in the form of a tube 33 which is more clearly shown and described in Polye et al., U. S. Patent No. 2,463,805, issued March 8, 1949. In addition to the heater elements, delay tube 33 contains two resistors 34 and 35 which constitute two adjoining arms of a Wheatstone bridge circuit, the remaining arms of which are preferably located outside of the tube and constitute a center tapped resistor 36. Resistors 34 and 35 are arranged in heat exchange relation with heater elements 29 and 30 and the constants of the tube may be so selected as to provide any desired time lag between the input signal and the unbalance of the bridge.

One diagonal of the bridge defined by the junction point of resistor 36 and the free ends of resistors 34 and 35 is connected by way of leads 37 and 38 with a suitable power source. The remaining diagonal of the bridge defining the output thereof is associated at its opposite points with a conductor 39 and an adjustable tap 40.

Coming now to the operation of the novel circuit hereinabove described, an input signal appearing at secondary winding 12 is communicated to and amplified by high gain amplifier 14 and fed therefrom to the grids 20 and 21 of the discriminator tubes. Depending upon the phase of the plate supply and the phase of the incoming signal, current will flow in the plate circuits of one or the other of the discriminator tubes in a well known manner, such plate currents heating either heater element 29 or 30. The grids of the discriminators are biased so that the heater elements, for zero signal input, are maintained heated continuously at the midpoint of the useful range. As the amplified input signal is impressed on the grids of the discriminators, more current will flow in one of the heater elements and less in the other so that due to the heat exchange relation of the heater elements and resistors 34 and 35 the bridge will become unbalanced creating a voltage across tap 40 and conductor 39.

The voltage created in the foregoing manner may be utilized to operate some desired controlled expedient and to this end it is impressed across a primary winding 41 of a transformer 42 whose secondary winding 43 may be connected directly, or through a voltage amplifier (not shown), to such an expedient. The voltage appearing at the bridge output, furthermore, is impressed across a primary winding 44 of a feed back transformer 45 whose secondary winding 46 is arranged in series with the secondary winding of transformer 10. With the use of the latter feed back arrangement, leads 37 and 38 are so connected to the supply source that the bridge output signal is phased to oppose the input signal impressed on primary winding 11.

It will now be apparent that the overall novel circuit above described in reality constitutes a closed servo system in which the input signal communicated to tube 14 drives or operates tube 33 through high gain until the feed back signal communicated from the bridge output to secondary winding 46 is equal and opposite to the input signal. For a static state of the system, therefore, i. e., where the input signal is of a given constant amplitude, the feed back signal at secondary winding 46 will always be numerically equal to the input signal. Inasmuch as the feed back and input signals always bear a constant ratio to each other, the output signal across transformer 42 will always be numerically exactly equal to the input signal modified by some selected amplification factor. Thus the output signal follows the input signal linearly.

A further useful signal may be derived from the above described novel circuit by incorporating a transformer 47 therein, the primary winding 48 of which may have one end connected with plate 17 and the opposite end thereof with a plate supply. As a result of the signal applied to input transformer 10, a voltage will appear across the secondary winding 49 of transformer 47 which will be the algebraic difference (amplified) between the input and feed back signals and as such will be a measure of the viscous damping of the system. The voltage appearing across the secondary of transformer 47 is, therefore, a rate signl of type constituting the difference of two rates, the rate of change of the input signal minus the rate of change of the output signal. Inasmuch as the viscous damping of the system will depend upon the selected time constant of time delay tube 33, the rate signal will vary for given conditions with the time constants of the tube selected. In some applications, therefore, the signal appearing across secondary 49 may be utilized as a rate signal.

In addition to the above-described operation, the novel circuit hereof may also be used extensively as either a high pass or a low pass filter or both, the frequencies to be passed determining the time constant of time delay tube 33. For example, if a thermal time delay tube having a thirty-second time constant is selected and the input applied at transformer 10 consists of a variable signal comprising two super-imposed voltages or components, one having a frequency of sixty cycles per second and the other a frequency of one-half cycle per minute, the first signal component will appear between grid 13 of tube 14 and ground virtually unchanged but will not appear at the output of transformer 42 because the thermal inertia of a time delay tube with a thirty second time constant will be too great to pass the higher frequency. However, the same time delay tube will readily respond to the lower frequency of one-half cycle per minute and the signal component having the latter frequency will appear at the output of transformer 42. If the gain of tube 13 is very high, no appreciable part of the lower frequency signal will appear between the grid 13 of tube 14 and ground because, as the impressed lower frequency signal component appears in the secondary of transformer 10, it is continuously cancelled out by the output of feed back transformer 45. This cancelling process is carried out in accordance with the servo action heretofore described.

If the voltage between grid 13 of tube 14 and ground is monitored, only the sixty-cycle per second frequency will appear across secondary winding 49 of transformer 47 and which may be associated with any desired expedient that it is desired to operate in response to the higher frequency signal component while, at the same time, only the one-half cycle per minute frequency will appear at the output of transformer 42. In this manner, therefore, the two frequencies are separated and the circuit will have acted as both a high pass and a low pass filter.

Figure 3:
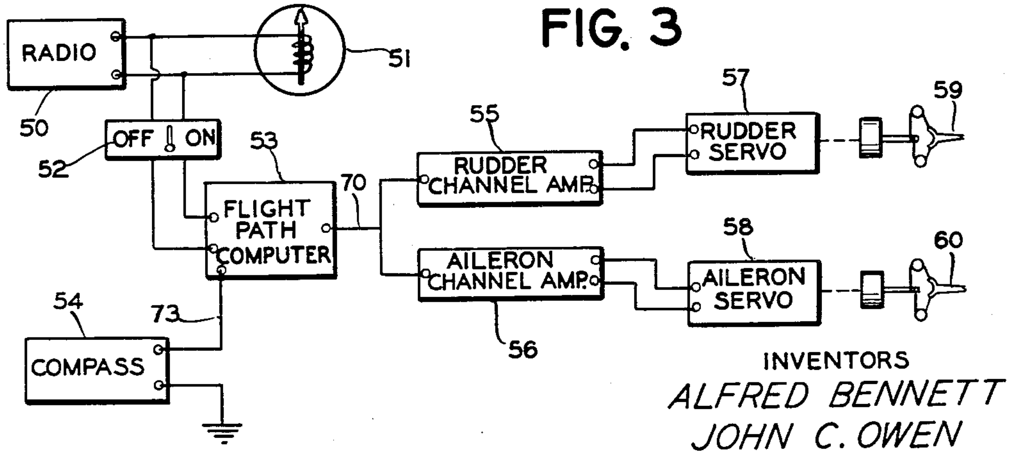

One desirable application of the novel circuit of Figure 1 is for damping purposes in connection with an automatic steering system for aircraft as shown in Figure 3 of the drawing. The steering system shown schematically in the latter figure includes a radio receiver 50 tuned to either a localizer or glide path radio beam (where elevator and/or throttle are to be controlled), a cross-pointer meter 51 (the vertical needle only of which is shown), and a switch 52 which when operated to its "on" position communicates a control signal developed by movement of the cross-pointer to the input of a flight path computer unit 53 which also receives a heading signal at its input from a compass 54, the output of the computer operating through rudder and aileron channel amplifiers 55 and 56, rudder and aileron servo motors 57 and 58 for controlling rudder and aileron surfaces 59 and 60, respectively. The system shown schematically in Figure 3 is more fully described and claimed in copending applicaiton Serial No. 705,524, filed October 25, 1946 and assigned to the assignee of the present application and now U. S. Patent No. 2,592,173, issued April 8, 1952.

Figure 2:
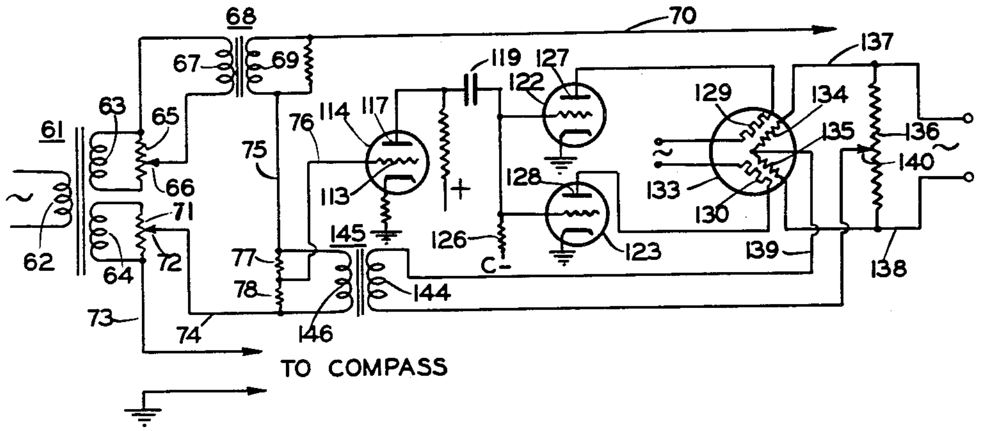
Figure 2 is a wiring diagram illustrating one of the many applications of the novel electric circuit of Figure 1 for control purposes; and, Figure 3 is a schematic illustration of an automatic steering system for mobile craft utilizing the novel electric circuit hereof.

As better shown in Figure 2 of the drawing the novel circuit hereof to be used for damping purposes with the automatic steering system of Figure 3 comprises an input transformer 61 having a primary winding 62 and a pair of secondary windings 63 and 64. Secondary winding 63 has a resistor 65 thereacross which is engaged by an adjustable tap 66, a primary winding 67 of a transformer 68 being connected across tap 65 and one end of secondary 63. The secondary winding 69 of the latter transformer connects by way of a lead 70 with the input of either or both rudder and aileron channel amplifiers 55 and 56.

The secondary winding 64 of transformer 61, on the other hand, has a resistor 71 connected thereacross engageable by an adjustable tap 72, one end of the transformer being associated by way of a lead 73 with compass 54, one side of the latter being grounded as shown. Tap 72 of resistor 71 connects by way of a lead 74 with one end of a secondary winding 146 of a feed back transformer 145, the opposite end of the winding connecting by way of a lead 75 with primary 69 of transformer 68. The secondary winding 144 of transformer 145 is connected, as in Figure 1, across the output diagonal of the bridge defined by the junction point of resistors 134, 135 and tap 140 engaging with resistor 136. The bridge is connected across a suitable source of supply by way of conductors 137 and 138, the latter being arranged so that upon unbalance of the bridge the voltage across conductor 139 and tap 140 will be in phase opposition to the phase of the displacement signal communicated to secondary winding 146 of transformer 145 by way of secondary 64 of the input transformer.

Resistors 134 and 135 are the adjoining two arms of the bridge and constitute elements of the time delay tube 133 in which the heater elements 129 and 130 are arranged in heat exchange relation therewith. Heater element 129 is connected at one end to one side of a suitable source of supply and at its other end with the plate 127 of a discriminator tube 122 while heater element 130 is connected at one end with the opposite end of the source and its other end with plate 128 of discriminator tube 123. Both grids 120 and 121 of tubes 122 and 123 are grounded by way of a grid leak resistor 126 and connected through a condenser 119 with the plate 117 of a high gain amplifier tube 114. Grid 113 of the latter tube connects by way of a lead 76 with the junction point of a pair of resistors 77 and 78 arranged across secondary winding 146 of transformer 145 for a purpose to presently appear.

It may be assumed that an aircraft provided with the automatic steering system of Figure 3 is off to one side of a localizer radio beam and switch 52 has been operated to its "on" position. Assuming further a constant deflection of the needle of the cross-pointer meter to one side of zero, i. e., with no rate of change of needle motion, the signal resulting from needle deflection will be of a given amplitude so that it will communicate by way of transformer 61 and its secondary 63 as well as transformer 68 with the input channel of amplifiers 55 and 56 to deflect the rudder and aileron surfaces to direct the craft toward the beam.

At the same time that the signal due to needle displacement is applied to secondary 69 of transformer 68 by way of the secondary 63 of the input transformer, it is also applied by way of secondary 64 of the input transformer in series with the secondary 146 of the feed back transformer and across grid 113 of amplifier tube 114. Depending upon the polarity of the displacement signal, either plate 127 of tube 122 or plate 128 of tube 123 will become conductive to heat either element 129 or 130. As a result of the foregoing action, the bridge will become unbalanced whereupon a signal will appear across the bridge output and the primary winding of the feed back transformer in phase opposition to the displacement signal appearing at secondary 146 to cancel the latter, grid 113 being connected to the junction point of resistors 77 and 78 so that it will be self-sustaining. The displacement and feed back signals being equal and opposite when the deflection of the needle is constant no rate signal will be applied to the displacement signal appearing at secondary 69.

Upon application of rudder and aileron in the foregoing manner, the craft will be maneuvered into a turn toward the beam and the needle of the cross-pointer meter will begin a return to zero which position it will attain when the craft crosses the beam. As a result of such needle movement, the displacement signal applied to input transformer 61 will drop in amplitude and while the signal drop will appear instantly at secondary 69 of transformer 68, it will not appear, except after a predetermined interval of time defined by the time constant of time delay tube 133, across the primary of the feed back transformer. For this reason, the feed back signal will for a time exceed the value of the displacement signal so that a resultant or rate signal will appear at the feed back transformer which will be fed by way of lead 75 to secondary 69 of transformer 68 to be there added in phase opposition with the displacement signal. In this manner the novel circuit hereof provides a damping control for the approach to and capture of the beam by the aircraft so that the craft will not oscillate unduly about the beam. Damping is also provided by the aforementioned circuit when the craft is flying along the beam to prevent hunting or oscillation.

It will be obvious that should the craft during its return to the beam, as a result of side winds, become displaced suddenly further from the beam, the displacement signal at secondary 64 will increase in amplitude so that it will exceed the feed back signal of transformer 145 and the difference thereof will be impressed on the displacement signal at secondary 69 to assist the latter signal in returning the craft to the beam, with the feed back signal eventually exceeding the displacement signal to dampen the system.

In order to maintain the craft on the beam, a compass signal is also utilized in addition to the radio signal to act therewith in maintaining the craft on the beam. The signal of compass 54 is fed by lead 73 to mix with the displacement signal in secondary 64 of the input transformer. In the absence of anything else, when the craft is turning toward the beam the compass signal would act to turn the craft to its original heading and away from the beam. However, with the novel circuit hereof, the compass signal is impressed on grid 113 to develop a feed back voltage across the feed back transformer to balance out the compass signal at such time. For a rapid change in heading such as that due to air turbulence, a portion of the compass signal is passed through directly to secondary winding 69 and thereby acts to stabilize the craft in yaw.

It will now be apparent to those skilled in the art that a novel control circuit has been provided by the present invention which will not only act as a follow-up and a damping control in numerous applications but also as a high pass or low pass filter or both.

We claim:

1. In a control system having a controlling and a controlled element, a first channel comprising means connected with said controlled element for operating the latter in response to a displacement signal developed by said controlling element, a second channel defining a damping signal developing circuit connected to receive said displacement signal and comprising a time delay device for reproducing in a delayed manner the displacement signal of the second channel, means for communicating the reproduced signal to oppose the displacement signal of the second channel whereby the latter channel will be balanced when said displacement signal is of a constant amplitude and unbalanced when said displacement signal is of a varying amplitude, and means for communicating the difference of the two signals of said second channel to the displacement signal of said first channel.

2. Electrical means comprising a low pass filter having an input device adapted to receive signals of opposite phases comprising a pair of components of different frequencies, a discriminator connected to said input to detect the phase of the signals, means comprising a thermal time delay device connected to said discriminator to receive the discriminated signals and having a predetermined thermal time constant so as to respond to only the lower frequency component and to be unresponsive to the higher frequency component, and output means at which said lower frequency component appears associated with said delay device.

3. An electric filter circuit comprising an input adapted to receive a modulated alternating current signal comprising an envelope having a pair of components of different frequencies, means comprising a thermal device associated with said input and having a time constant of sufficient length so as to respond to only one of said components to develop a modulated alternating current voltage of the same fraquency as said one component, and means connecting said device and said input for feeding back said last-named voltage to cancel said one component at said input.

References Cited in the file of this patent

UNITED STATES PATENTS

| | | |
|---|---|---|
| 2,025,775 | Rieber | Dec. 31, 1935 |
| 2,098,968 | Mallinchrodt | Nov. 16, 1937 |
| 2,258,128 | Black | Oct. 7, 1941 |
| 2,275,452 | Meacham | Mar. 10, 1942 |
| 2,346,838 | Haight | Apr. 18, 1944 |
| 2,357,922 | Zeibolz et al. | Sept. 12, 1944 |
| 2,375,273 | Black | May 8, 1945 |
| 2,379,744 | Pfleger | July 3, 1945 |
| 2,383,984 | Oberweiser | Sept. 4, 1945 |
| 2,423,505 | Landon | July 8, 1947 |
| 2,459,104 | Gilbert | Jan. 11, 1949 |
| 2,460,690 | Glass | Feb. 1, 1949 |
| 2,464,249 | McCoy | Mar. 15, 1949 |
| 2,533,587 | Kittredge | Dec. 12, 1950 |

FOREIGN PATENTS

| | | |
|---|---|---|
| 366,920 | Great Britain | May 14, 1931 |